(12) United States Patent
Chertoff

(10) Patent No.: US 7,665,277 B2
(45) Date of Patent: Feb. 23, 2010

(54) OPTICAL DISC RECEPTACLE

(76) Inventor: Wayne Chertoff, 249-11 61st Ave., Little Neck, NY (US) 11362

( * ) Notice: Subject to any disclaimer, the term of this patent is extended or adjusted under 35 U.S.C. 154(b) by 0 days.

(21) Appl. No.: 12/082,550

(22) Filed: Apr. 11, 2008

(65) Prior Publication Data

US 2009/0260025 A1 Oct. 15, 2009

(51) Int. Cl.
B65B 11/00 (2006.01)
B65B 25/24 (2006.01)
B65D 85/57 (2006.01)
(52) U.S. Cl. .................. 53/397; 53/409; 206/308.1
(58) Field of Classification Search .............. 206/303, 206/307, 308.1, 309, 311, 312, 313; D9/702–714, D9/720; 150/154–168; 53/397, 409, 441
See application file for complete search history.

(56) References Cited

U.S. PATENT DOCUMENTS

| | | | |
|---|---|---|---|
| 4,869,305 A * | 9/1989 | Jones | 150/155 |
| 5,530,986 A * | 7/1996 | Rackley, Sr. | 150/165 |
| 5,791,467 A * | 8/1998 | Mahone | 206/308.1 |
| D491,407 S | 6/2004 | Martinetti | |
| D499,597 S | 12/2004 | Martinetti | |
| 6,860,388 B2 | 3/2005 | Boorman | |
| 6,883,663 B2 * | 4/2005 | Laut | 206/308.1 |
| 6,964,401 B1 * | 11/2005 | Kelley et al. | 206/308.1 |
| 7,311,198 B2 * | 12/2007 | Bergus et al. | 206/308.1 |
| 7,331,452 B2 | 2/2008 | Bergh et al. | |
| 2004/0016484 A1 * | 1/2004 | Muller | 150/158 |

* cited by examiner

*Primary Examiner*—J. Gregory Pickett
(74) *Attorney, Agent, or Firm*—Dilworth & Barrese, LLP

(57) ABSTRACT

An optical disc receptacle adapted for storing an optical disc is provided. The optical disc receptacle includes a body configured for disposal about the optical disc. The body includes an end portion arcuately disposed about the optical disc and extending to a perimeter. The perimeter forms a window configured to visually display the optical disc. The body includes a pliable first layer and a second soft fabric layer configured to engage digital data readable portions of the optical disc. The optical disc can include a first side having digital data readable portion and a second side having digital data readable portions.

3 Claims, 6 Drawing Sheets

OPTICAL DISC RECEPTACLE

TECHNICAL FIELD

The present disclosure generally relates to storage devices for optical discs, and more particularly, to an optical disc receptacle, which has a pliable configuration for storing an optical disc and includes a soft fabric layer for protecting digital data readable portions of the optical disc.

BACKGROUND OF THE INVENTION

Optical discs are well known in computing, sound reproduction and video applications. For example, compact discs (hereinafter "CDs") carry digital information such as sound and music recordings. Optical discs that carry digital information for movies and video games with accompanying sound are known as Digital Video Discs (hereinafter "DVDs"). An optical disc is a flat, circular, usually polycarbonate disc where digital data is stored within a flat surface of the disc. The optical disc includes a central opening configured for mounting with an appropriate digital data reading device such as a DVD player, CD player, hard drive, etc. The digital data is typically stored within a single spiral track, disposed about the entire readable portion of the flat surface, whereby the digital data is recorded thereon and then read by the appropriate device. The digital data is generally accessed when a material on the disc, such as aluminum, is illuminated with a laser diode.

The optical disc can also include non-readable portions, which may include visually identifying material for the optical disc, such as a movie title, etc. For example, an optical disc having a single side dedicated for reading digital data may have a label silk-screened onto the non-readable side. In the case of a double-sided disc, labels or other identifying material are printed only on the non-readable area near the central opening.

While optical discs are significantly more durable than earlier audio/visual and data formats, they are susceptible to damage from daily usage and environmental factors.

DVDs, CDs, computer software and/or video games are generally sold to consumers in "jewel boxes", which are rigid plastic containers that carry the optical disc. The jewel boxes are bulky, difficult to store and are not conveniently opened or closed to remove the optical discs. Optical discs can also be sold and packaged to consumers with retail cardboard or heavy paper. However, the cardboard or heavy paper packages do not stack well and are prone to tearing, wrinkling, bending and surface wear.

Aftermarket sleeve cases are also available, which include a plurality of sleeves that are fabricated from vinyl and transparent plastic. These types of sleeves, however, tend to be more rigid than flexible, and may have a rough texture that may damage the digital data readable portions of the optical disc. Further, sleeve cases that store a plurality of optical discs tend to be bulky and cumbersome. In these instances, the optical disc is tended to be transported bare, where it can be exposed to heat and abrasion.

Therefore, it would be desirable to overcome the disadvantages and drawbacks of the prior art with an optical disc receptacle having a pliable configuration for storing an optical disc and including a soft fabric layer for protecting digital data readable portions of the optical disc. It would be most desirable if the optical disc receptacle surrounds the optical disc in a protective configuration and forms a window for viewing non-readable portions of the optical disc. It would be highly desirable if the optical disc receptacle is easily and efficiently manufactured.

SUMMARY OF THE INVENTION

Accordingly, an optical disc receptacle is provided having a pliable configuration for storing an optical disc and including a soft fabric layer for protecting digital data readable portions of the optical disc for overcoming the disadvantages and drawbacks of the prior art. Desirably, that optical disc receptacle surrounds the optical disc in a protective configuration and forms a window for viewing non-readable portions of the optical disc. It is contemplated that the optical disc receptacle is easily and efficiently manufactured.

In one particular embodiment, in accordance with the principles of the present disclosure, an optical disc receptacle adapted for storing an optical disc is provided. The optical disc receptacle includes a body configured for disposal about the optical disc. The body includes an end portion arcuately disposed about the optical disc and extending to a perimeter. The perimeter forms a window configured to visually display the optical disc. The body includes a pliable first layer and a second soft fabric layer configured to engage digital data readable portions of the optical disc. The optical disc can include a first side having digital data readable portion and a second side having digital data readable portions.

The body may have a flexible configuration. The body can include a central portion and a circumferential end portion. The central portion is configured to abut a surface of a first side of the optical disc and the end portion is configured to abut a surface of the second side.

The perimeter may include an elastic track configured to form the window. The end portion may include a pleat configured to facilitate formation of the window. The end portion can include a plurality of pleats circumferentially disposed thereabout and being configured to facilitate formation of the window.

In an alternate embodiment, the first layer is bonded to the second layer. The first layer can be a laminate of several layers. The first layer may be liquid impervious. The first layer may be fabricated from a material selected from the group consisting of polyethylene, polypropylene, polyester, nylon and polyvinyl chloride. The second layer can be fabricated from a material selected from the group consisting of non-woven spun bonded webs of polypropylene, polyethylene, nylon and polyester. The elastic track can be fabricated from a material selected from the group consisting of natural rubber, butyl rubber, synthetic rubber and urethane.

In an alternate embodiment, the optical disc receptacle includes a flexible body configured for disposal about the optical disc. The body includes a central portion disposed about a first side of the optical disc having digital data readable portions and a circumferential end portion arcuately disposed about an outer portion of a second side of the optical disc. The end portion extends to a perimeter including an elastic track. The elastic track defines a window configured to display a non-readable digital data surface of the second side. The body includes a pliable, fluid impervious layer bonded to a soft fabric layer configured to engage the digital data readable portions of the optical disc.

In another alternate embodiment, a method of storing an optical disc is provided. The method includes the steps of: providing an optical disc receptacle, similar to those described herein; providing an optical disc having a first side and a second side, wherein at least a portion of the optical disc includes readable digital data and at least a portion of the optical disc includes a non-digital data surface; expanding the window such that the optical disc is receivable by the receptacle; and receiving the optical disc with the receptacle in a configuration such that the readable digital data portions of the first side engage the second soft fabric layer and are protected thereby, and the pliable first layer encompasses the optical disc, and the window contracts in a configuration to visually display the non-digital data surface of the second side.

Alternatively, the method of storing an optical disc further includes the step of transporting the receptacle having the optical disc disposed therein. The step of receiving may further include engaging readable digital data portions of the second side with the second soft fabric layer in a protective configuration.

BRIEF DESCRIPTION OF THE DRAWINGS

The above and other objects, features and advantages will become more readily apparent from the specific description accompanied by the following drawings, in which.

Like reference numerals indicate similar parts throughout the figures.

DETAILED DESCRIPTION OF THE INVENTION

Figure 1:
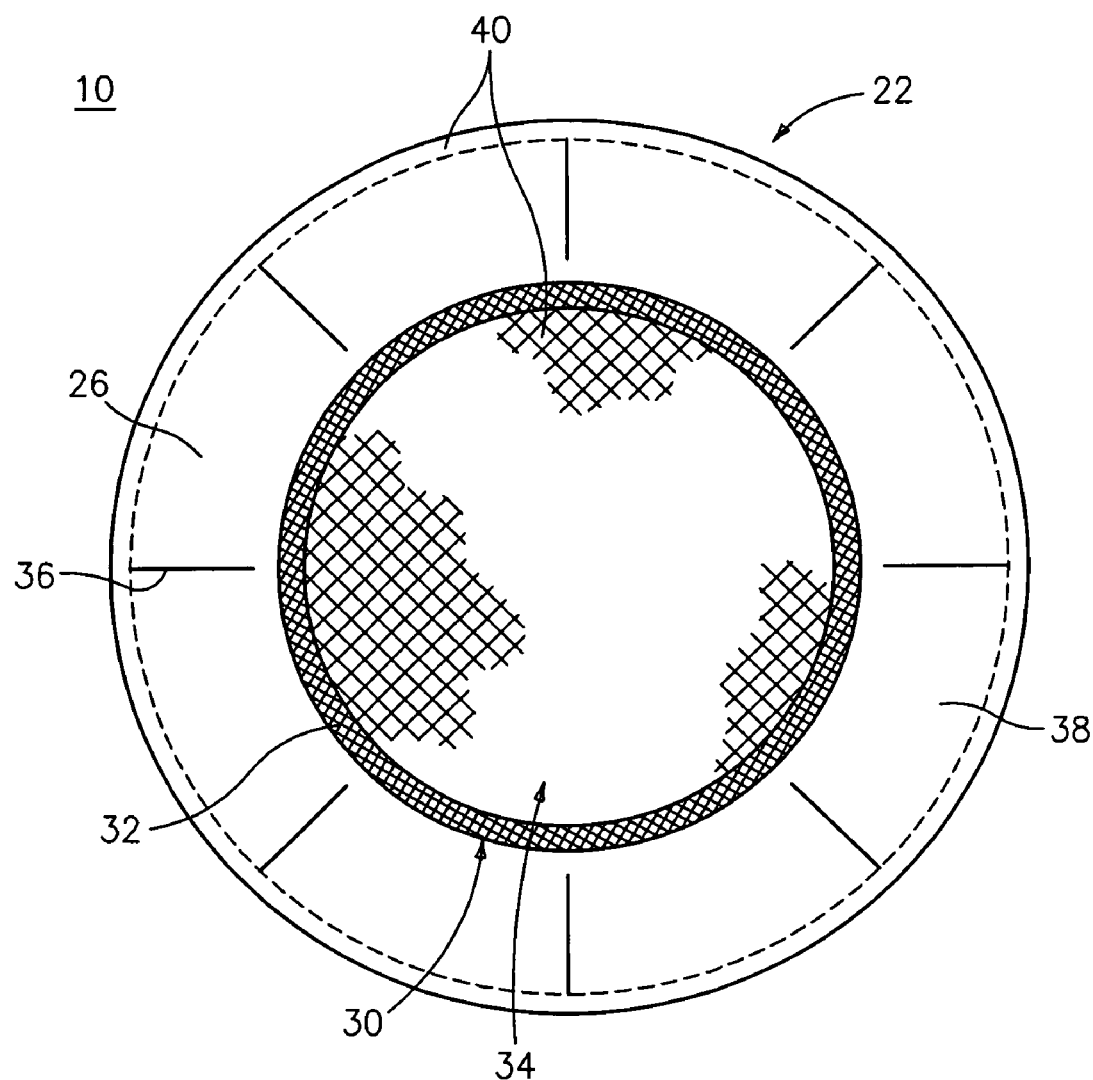
FIG. 1 is a plan view of an optical disc receptacle, in accordance with the principles of the present disclosure.
Figure 2:
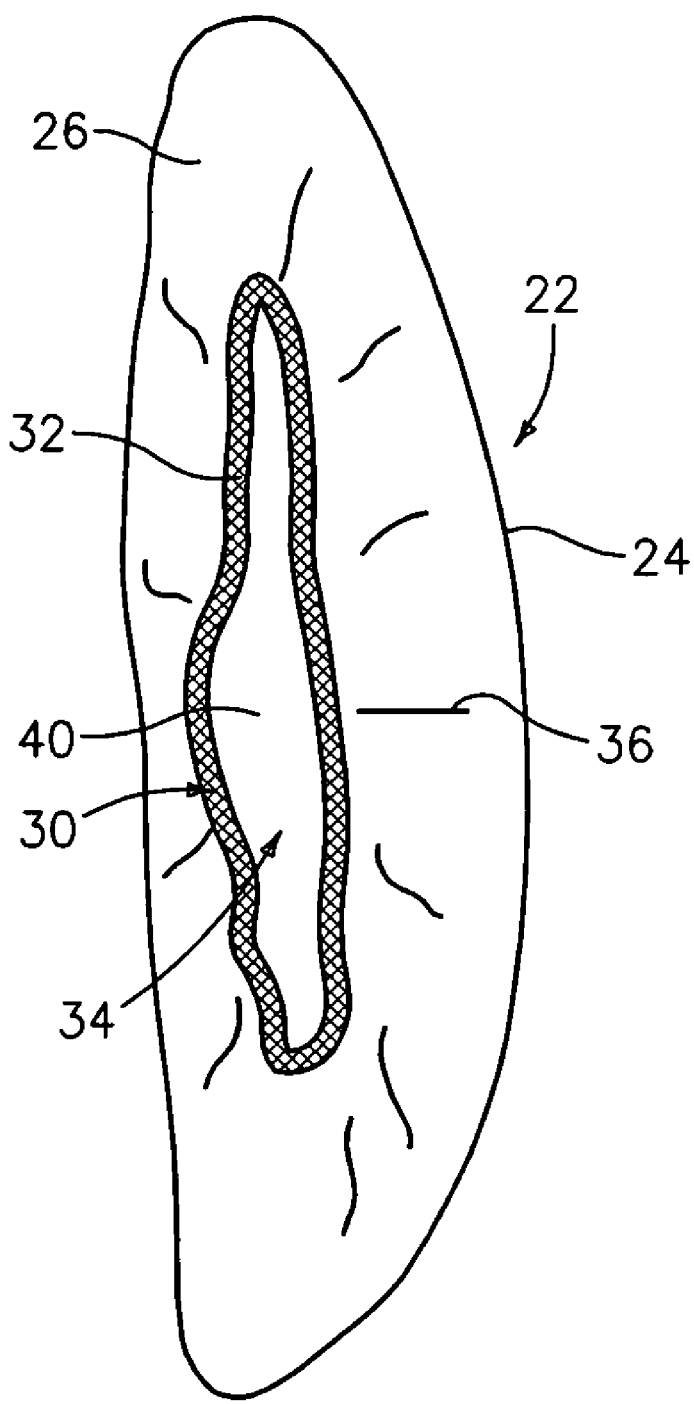
FIG. 2 is a side perspective view of the optical disc receptacle shown in FIG. 1.
Figure 3:
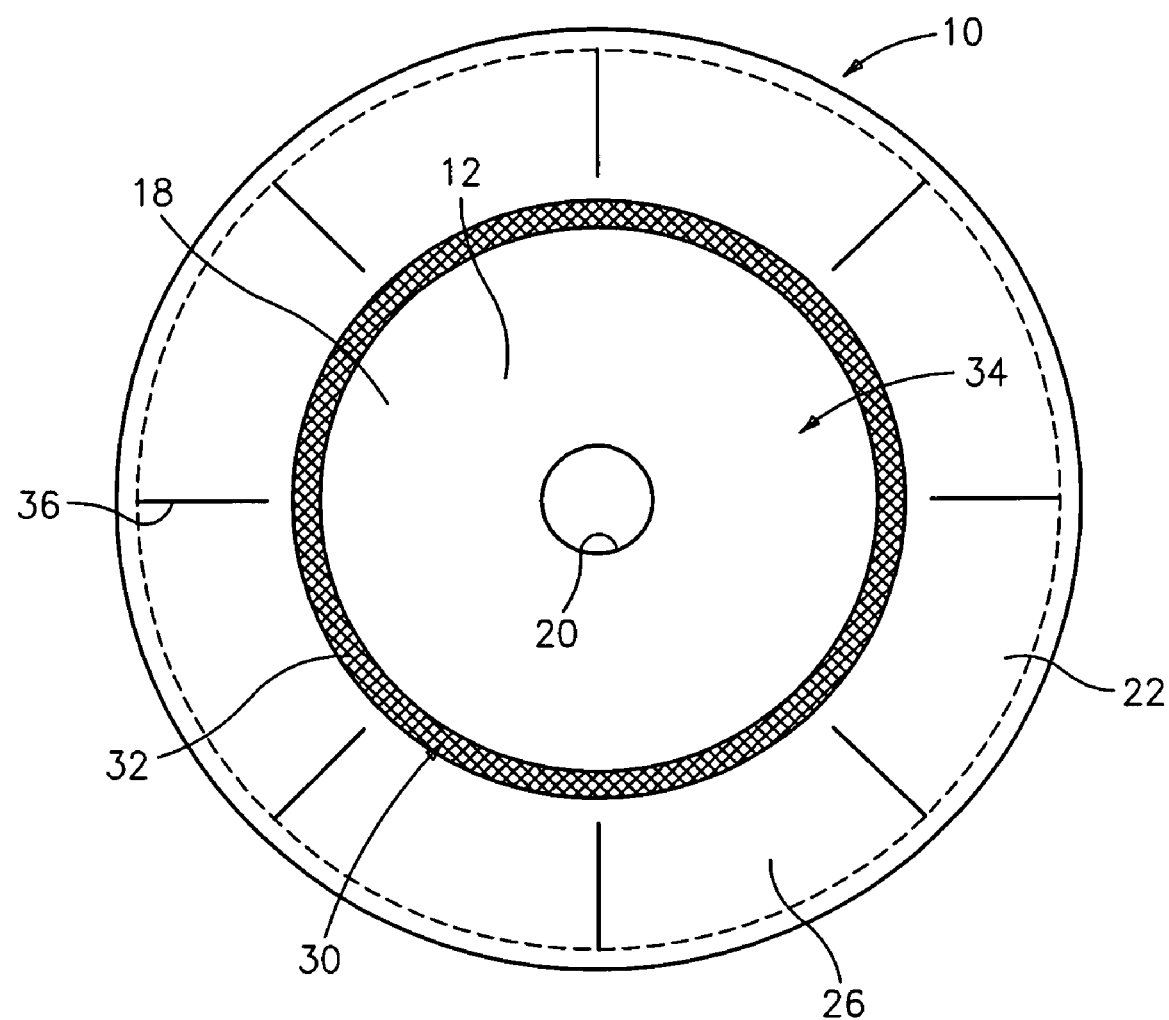
FIG. 3 is a plan view of the optical disc receptacle shown in FIG. 1 having an optical disc disposed therein.
Figure 4:
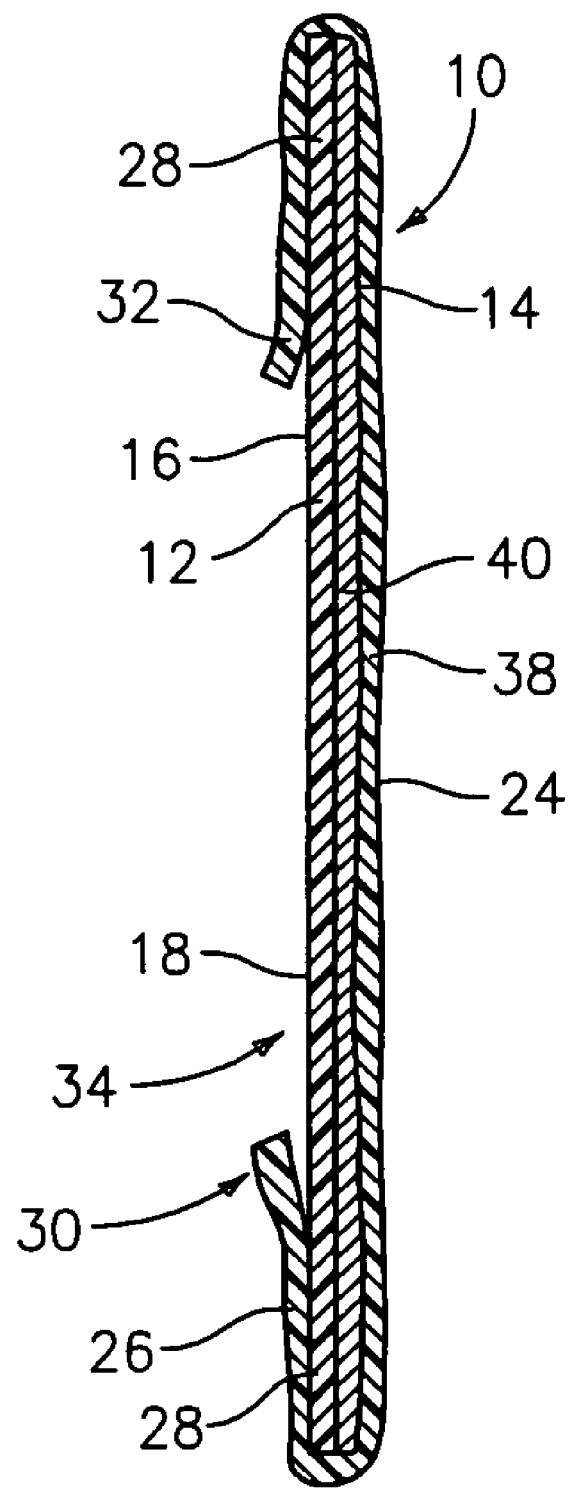
FIG. 4 is a side, cross-sectional view of the optical disc receptacle shown in FIG. 1 with the optical disc disposed therein.
Figure 5:
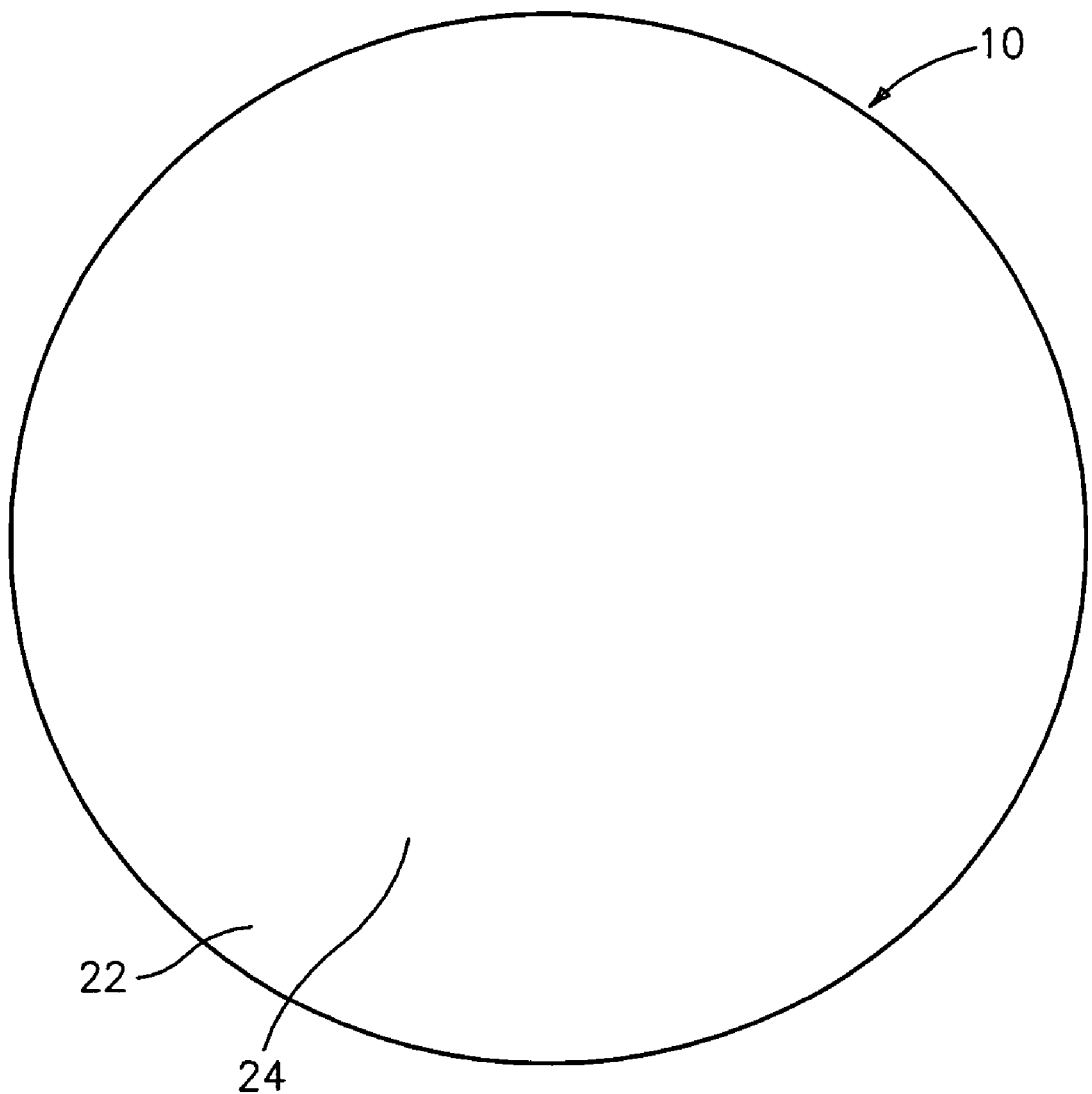
FIG. 5 is a plan view of a closed side of the optical disc receptacle shown in FIG. 1 with the optical disc disposed therein.

The exemplary embodiments of the optical disc receptacle and methods of use disclosed are discussed in terms of storage devices for optical discs and more particularly, in terms of an optical disc receptacle having a flexible configuration for storing an optical disc and, which includes a soft fabric layer for protecting readable portions, such as a spiral track of digital data, of the optical disc. It is envisioned that the present disclosure may be employed with a range of applications including various types of optical discs, such as, for example, CDs, DVDs, high definition DVDs, laser discs, mini discs, blu-ray discs and computer software discs. It is envisioned that the present disclosure may be employed with optical discs having a single or a plurality of digital data readable track layers, single readable sided discs, or discs having readable track portions on both sides. It is contemplated that the non-readable portions of the optical disc may include text or other visually identifiable material. The non-readable portions of the optical disc may include tactile perceptible material.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The following discussion includes a description of an optical disc receptacle, related components and exemplary methods of employing the optical disc receptacle in accordance with the principles of the present disclosure. Alternate embodiments are also disclosed. Reference will now be made in detail to the exemplary embodiments of the present disclosure, which are illustrated in the accompanying figures. Turning now to FIGS. 1-5, there is illustrated an optical disc receptacle 10 in accordance with the principles of the present disclosure.

The components of optical disc receptacle 10 are fabricated from materials suitable for optical disc storage applications, depending on the particular application and/or preference. One skilled in the art, however, will realize that such materials and fabrication methods suitable for assembly and manufacture, in accordance with the present disclosure, would be appropriate.

Optical disc receptacle 10 is adapted for storing an optical disc 12. Optical disc 12 has a first side 14 and a second side 16. First side 14 includes stored digital data comprising media such as movies, music, etc. stored on optical disc 12. Second side 16 includes a non-digital data surface 18, which does not include stored digital data or media. Surface 18 includes visual identifying material, which identifies the media or digital data stored on optical disc 12, such as, for example, movie title, program name, etc. Optical disc 12 also defines an opening 20 configured for mounting with a digital data reading device such as a DVD player, CD player, hard drive, etc.

It is contemplated that all or only a portion of first side 14 may include stored, readable digital data. First side 14 may also include visually identifying material. Second side 16 may also include portions having stored, readable digital data. It is envisioned that surface 18 may include tactile perceptible information, which identifies the media or digital data stored are optical disc 12.

Optical disc receptacle 10 has a flexible body 22 configured for disposal about optical disc 12. Body 22 includes a central portion 24 disposed about first side 14, which has digital data disposed therewith. Central portion 24 abuts the surface of first side 14 and extends over the circumferential edge of optical disc 12 to a circumferential end portion 26 of optical disc receptacle 10.

Circumferential end portion 26 is arcuately disposed about an outer portion 28 of second side 16. End portion 26 abuts the surface of second side 16, adjacent outer portion 28. It is envisioned that end portion 26 abuts all or only a portion of the surface of second side 16. It is contemplated that end portion 26 can be configured to cover and protect readable digital data portions of second side 16.

End portion 26 has a circumferential orientation and extends uniformly to a perimeter 30 of body 22. Perimeter 30 includes an elastic track 32, which defines a window 34 configured to display surface 18. Elastic track 32, has a banded ring configuration and encircles window 34 to display visually identifiable material, which identifies text, pictorials, photos, etc. relating to the digital data or media stored on optical disc 12, such as a title, etc. Such visually identifiable material may be printed, silk screened, mounted, etc. It is envisioned that elastic track 32 may be configured to form alternatively shaped windows, such as, for example, polygonal, elliptical, etc. It is contemplated that perimeter 30 may include a transparent film or plastic layer configured to cover surface 18. Such a layer may include opaque or partially opaque portions.

End portion 26 includes pleats 36, which are configured to facilitate formation of window 34. Pleats 36 are also configured to facilitate disposal of optical disc receptacle 12 about optical disc 10 such that receptacle 12 surrounds and protects disc 10 including readable digital data disposed therewith. It is envisioned that optical disc receptacle 12 may include pleats formed in other sections such as central portion 24. It is further envisioned that optical disc receptacle 12 may include one, a plurality or no pleats.

Optical disc receptacle 10 is fabricated such that body 22 has an advantageously pliable configuration for storing and surrounding optical disc 12 in a configuration for protecting digital data readable portions and forming window 34 for viewing surface 18. Body 22 is fabricated from and includes a pliable, fluid imperious layer 38. Layer 38 is bonded to a soft fabric layer 40 configured to engage the digital data readable portions of first side 14. It is envisioned that layer 40 may engage digital data readable and/or non-digital data surfaces of second side 16. For example, layer 38 and layer 40 each may have a thickness in the range of 0.02-1.0 mm. Other ranges of thickness are also contemplated.

It is envisioned that layer 38 can be bonded with layer 40 in various configurations. Layer 38 and layer 40 are associated with one another. Layer 38 is directly joined to layer 40 by affixing layer 38 directly to layer 40. It is contemplated that layer 40 can be indirectly joined to layer 38 by affixing layer 40 to intermediate members, which in turn are affixed to layer 38. While layer 38 and layer 40 have substantially the same thicknesses and geometry, they may also have different thicknesses and geometries.

The bonding between layers 38, 40 of receptacle 10 may be accomplished using joining methods known in the art, such as, for example, compression bonds, heat bonds, ultrasonic bonds, adhesives and the like, or combinations of different bonding methods.

Layer 38 may be fabricated from a pliable liquid-impervious material suitable for optical disc storage applications, including films of polyethylene, polypropylene, polyester, nylon, polyvinyl chloride and blends of these materials. For example, layer 38 can be comprised of a pigmented polyethylene film having a thickness in the range of 0.02-0.04 mm. Layer 38 may comprise multiple panels. In alternate embodiments, layer 38 may be a laminate of several sheets or layers. Layer 38 may further be treated to render it hydrophilic or hydrophobic, and may have one or more visual indicators associated with it, such as labels or other characters or colorations.

Layer 40 is fabricated from a soft fabric layer suitable for optical disc storage applications and protection of readable digital data portions thereof. Woven materials such as felt, non-woven materials including non-woven spunbond or carded webs of polypropylene, polyethylene, nylon, polyester, may be used in a manner consistent with the present invention. A non-woven web of cellulosic fibers, textile fibers such as rayon fibers, cotton and the like, or a blend of cellulosic and textile fibers; or melt blown thermoplastic fibers, such as macro fibers or micro fibers of polypropylene, polyethylene, polyester or other thermoplastic materials or mixtures of such thermoplastic macro fibers or micro fibers with cellulosic, pulp or textile fibers, natural fibers (e.g., wood or cellulose), apertured plastic films, reticulated foams and porous foams, or blends of these materials may be used.

Layer 40 may be formed from one or more panels of material and may comprise a laminated sheet construction.

Elastic track 32 may be fabricated from various commercially available materials, such as natural rubber, butyl rubber or other synthetic rubber, urethane, or elastomeric materials such as spandex, which is marketed under various names, including LYCRA® (DuPont), GLOSPAN™ (Globe) and System 7000™ (Fulflex), etc. Elastic track 32 of the present invention is not limited to any particular elastic material or to any particular shape, size or number of elastics. Elastic track 32 may also be fabricated from elastic film, a multidirectional elastic aggregate such as elastic webbing, netting, or scrim elastic, foam, strands or bands of suitable elastic materials.

Figure 6:
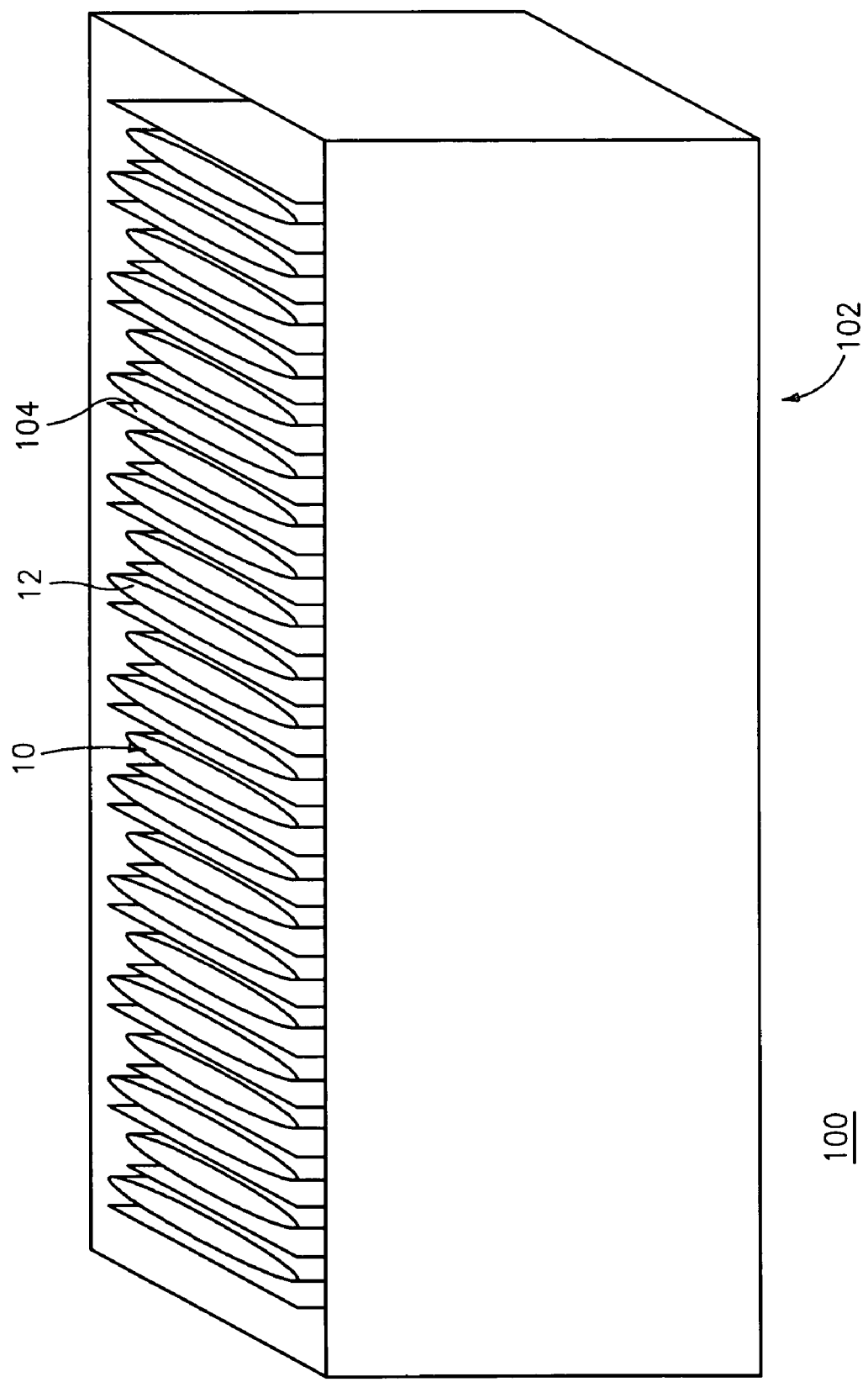
FIG. 6 is perspective view of an optical disc receptacle system in accordance with the principles of the present disclosure.

Referring to FIG. 6, in accordance with the principles of the present disclosure, a system 100 configured to store a plurality of optical discs 12 is provided. System 100 includes a cabinet 102 configured for disposal of a plurality of receptacles 10, which include optical discs 12 stored therein. Vanes 104 separate receptacles 10 and facilitate stacking, vertical or horizontal, of the stored optical discs 12. System 100 is advantageously configured to store and protect multiple optical discs 12.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method of storing an optical disc, the method comprising the steps of:
   providing an optical disc receptacle, the receptacle including a body configured for disposal about the optical disc, the body including an end portion arcuately disposed about the optical disc and extending to a perimeter, the perimeter forming a window configured to visually display the optical disc, wherein the body includes a pliable first layer and a second, soft fabric layer configured to engage digital data readable portions of the optical disc;
   providing an optical disc having a first side and a second side, wherein at least a portion of the optical disc includes readable digital data and at least a portion of the optical disc includes a non-digital data surface;
   expanding the window such that the optical disc is receivable by the receptacle; and
   receiving the optical disc with the receptacle in a configuration such that the readable digital data portions of the first side engage the second soft fabric layer and are protected thereby, and the pliable first layer encompasses the optical disc, and the window contracts in a configuration to visually display the non-digital data surface of the second side.

2. A method of storing an optical disc according to claim 1, further comprising the step of transporting the receptacle having the optical disc disposed therein.

3. A method of storing an optical disc according to claim 1, wherein the step of receiving further includes engaging readable digital data portions of the second side with the second soft fabric layer in a protective configuration.

* * * * *